United States Patent
Ukai

(10) Patent No.: US 10,360,243 B2
(45) Date of Patent: Jul. 23, 2019

(54) STORAGE MEDIUM, INFORMATION PRESENTATION METHOD, AND INFORMATION PRESENTATION APPARATUS

(71) Applicant: FUJITSU LIMITED, Kawasaki-shi, Kanagawa (JP)

(72) Inventor: Takanori Ukai, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 671 days.

(21) Appl. No.: 14/873,571

(22) Filed: Oct. 2, 2015

(65) Prior Publication Data

US 2016/0125065 A1 May 5, 2016

(30) Foreign Application Priority Data

Oct. 30, 2014 (JP) ................................. 2014-221210

(51) Int. Cl.
*G06F 16/00* (2019.01)
*G06F 16/28* (2019.01)
(Continued)

(52) U.S. Cl.
CPC ............ *G06F 16/285* (2019.01); *G06F 16/22* (2019.01); *G06F 16/258* (2019.01); *G06F 16/86* (2019.01); *G06F 16/955* (2019.01)

(58) Field of Classification Search
CPC ...... G06F 16/285; G06F 16/22; G06F 16/955; G06F 16/86; G06F 16/258
See application file for complete search history.

(56) References Cited

U.S. PATENT DOCUMENTS

| 2011/0276588 A1 | 11/2011 | Moon et al. |
| 2014/0025696 A1 | 1/2014 | Amano et al. |
| 2014/0059043 A1 | 2/2014 | Sundara et al. |

FOREIGN PATENT DOCUMENTS

| JP | 2005-258659 | 9/2005 |
| JP | 2007-052723 | 3/2007 |

(Continued)

OTHER PUBLICATIONS

Linked data for manuscripts in the Semantic Web written by Gordon Dunsire, Summer School in the Study of Historical Manuscripts, Zadar, Croatia, Sep. 26-30, 2011; Topic II: New Conceptual Models for Information Organization, 2012.*

(Continued)

*Primary Examiner* — Robert W Beausoliel, Jr.
*Assistant Examiner* — Hau Hoang
(74) *Attorney, Agent, or Firm* — Fujitsu Patent Center

(57) ABSTRACT

A non-transitory computer-readable storage medium stores a program that causes a computer to execute a process. The process includes obtaining data including multiple character strings that are separated from each other, identifying a first character string and second character strings in the obtained data, extracting third character strings indicating relationships between the first character string and the second character strings from character string collections stored in a database, selecting a character string collection from the character string collections based on proportions of the extracted third character strings included in the respective character string collections, and outputting information on the selected character string collection. Each of the character string collections includes character string sets each of which includes two character strings and a third character string indicating a relationship between the two character strings.

12 Claims, 8 Drawing Sheets

| VOCABULARY | Foaf | Vcard | skos+Vcard |
|---|---|---|---|
| CLASS (A) | person | person | person |
| COVERAGE RATE | 6/7 | 5/7 | 6/7 |
| USE FREQUENCY | 123 | 256 | 50 |
| TOTAL SCORE | (Foaf+Vcard) VOCABULARY 76 | | (Vcard+skos) VOCABULARY 43 |

(51) Int. Cl.
  *G06F 16/22*     (2019.01)
  *G06F 16/955*    (2019.01)
  *G06F 16/25*     (2019.01)
  *G06F 16/84*     (2019.01)

(56) References Cited

FOREIGN PATENT DOCUMENTS

| JP | 2014-021869 | 2/2014 |
|---|---|---|
| WO | 2010/137940 A1 | 12/2010 |

OTHER PUBLICATIONS

EPOA—European Patent Office Action dated Apr. 12, 2017 issued with respect to the corresponding European Patent Application No. 15187356.9.

Qi Zhou et al: "Spark: Adapting Keyword Query to Semantic Search", Nov. 11, 2007 (Nov. 11, 2007), The Semantic Web; [Lecture Notes in Computer Science], Springer Berlin Heidelberg, Berlin, Heidelberg, pp. 694-707, XP019136913, ISBN: 978-3-540-76297-3 *paragraph[0001]-paragraph[0004] **paragraph[0006]*.

J. Lehmann et al: "Discovering Unknown Connections—the DBpedia Relationship Finder", Sep. 1, 2007 (Sep. 1, 2007), XP055252579, Retrieved from the Internet: URL: https://www.researchgate.net/profile/Jens_Lehmann2/publication/221143456_Discovering_Unknown_Connections_-_the_DBpedia_Relationship_Finder/links/02e7e5273998748c16000000.pdf?inViewer=0&pdfJsDownload=0&origin=publication_detail [retrieved on Feb. 23, 2016] *paragraph[0001]-paragraph[0005]*.

EESR—Extended European Search Report dated Mar. 14, 2016 issued with respect to the corresponding European Patent Application No. 15187356.9.

Ora Lassila, et al., "Resource Description Framework (RDF) Model and Syntax Specification", W3C Recommendation Feb. 22, 1999, [online], Internet <URL:http://www.w3.org/TR/1999/REC-rdf-syntax-19990222/>, pp. 1-40 (40 pages).

Dan Brickley, et al., "RDF Vocabulary Description Language 1.0: RDF Schema 1.1", W3C Recommendation Feb. 25, 2014, [online], Internet <URL:http://www.w3.org/TR/rdf-schema/>, pp. 1-16 (16 pages).

Tim Bray, et al., "Namespaces in XML 1.0 (Third Edition)", W3C Recommendation Dec. 8, 2009, Internet <http://www.w3.org/TR/REC-xml-names>, pp. 1-12 (12 pages).

EPOA—Office Action dated Oct. 17, 2018 issued with respect to the corresponding European Patent Application No. 15187356.9.

* cited by examiner

FIG.3

| DATA FORMAT | CHARACTER STRINGS |
|---|---|
| CSV DATA (COMMA-SEPARATED CHARACTER STRINGS) | A , B , C , D , E , F , G , ····· |
| TSV DATA (TAB-SEPARATED CHARACTER STRINGS) | A   B   C   D   E   F   G ····· |
| SSV DATA (SPACE-SEPARATED CHARACTER STRINGS) | A B C D E F G ····· |
| ··· | ··· |

FIG.4

| DATA TYPE | DATA STRUCTURE | | |
|---|---|---|---|
| CSV DATA | Taro Honda, Honda, Taro, Osaka-fu, 1986-07-13, (ID1)<br>http://server/TaroHonda.jpg, male | | |
| RDF DATA | ( SUBJECT (S) , | PREDICATE (V) , | OBJECT (O) ) |
| | Taro Honda , | full name , | Taro Honda |
| | Taro Honda , | family name , | Honda |
| | Taro Honda , | nickname , | Taro |
| | Taro Honda , | hometown , | Osaka-fu |
| | Taro Honda , | birthday , | 1986-07-13 |
| | Taro Honda , | URL , | http://server/TaroHonda.jpg |
| | Taro Honda , | gender , | male |

FIG.6

| VOCABULARY | Foaf | Vcard | skos+Vcard |
|---|---|---|---|
| CLASS (A) | person | person | person |
| COVERAGE RATE | 6/7 | 5/7 | 6/7 |
| USE FREQUENCY | 123 | 256 | 50 |
| TOTAL SCORE | (Foaf+Vcard) VOCABULARY 76 | (Vcard+skos) VOCABULARY 43 | |

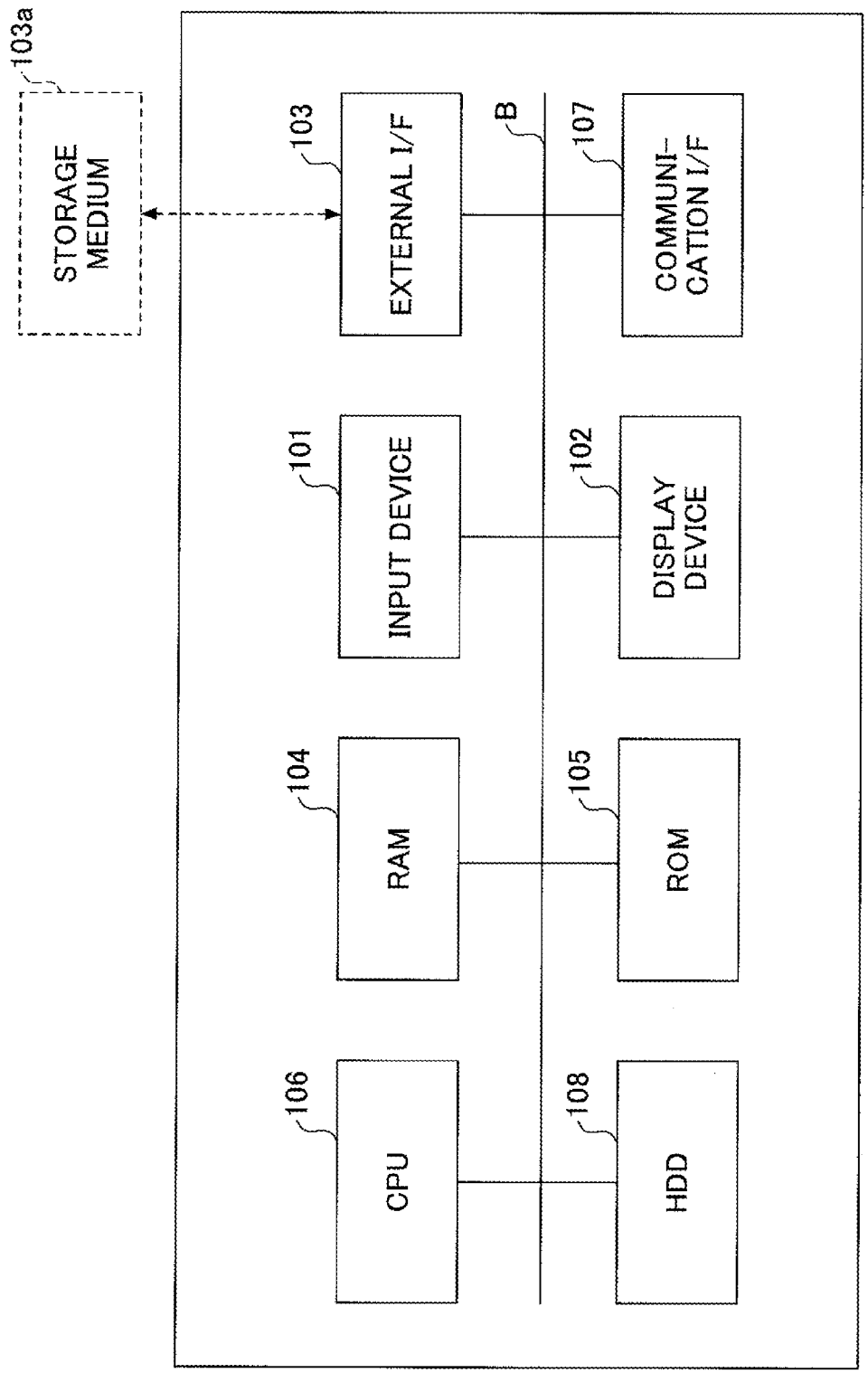

STORAGE MEDIUM, INFORMATION PRESENTATION METHOD, AND INFORMATION PRESENTATION APPARATUS

CROSS-REFERENCE TO RELATED APPLICATION

This application is based upon and claims the benefit of priority of Japanese Patent Application No. 2014-221210 filed on Oct. 30, 2014, the entire contents of which are incorporated herein by reference.

FIELD

An aspect of this disclosure relates to a storage medium, an information presentation method, and an information presentation apparatus.

BACKGROUND

Technologies have been proposed to standardize data formats of so-called "open data", which is information contained in documents created by, for example, central government offices and disclosed to the public, in order to facilitate use of the open data. For the efficient use of open data, it is preferable to publish open data as Linked Open Data (LOD) using a Resource Description Framework (RDF) format. RDF format data has a data structure "subject, predicate, object" that can be automatically processed by a computer, and is therefore easily reusable.

However, documents generated, for example, at companies, local government offices, and central government offices in formats such as an Excel format and a comma-separated value (CSV) format cannot be easily converted into RDF format data. This is one of the factors hindering the publication of open data as LOD using the RDF format.

For example, one of the reasons that make it difficult to convert CSV format data (which may also be referred to as "CSV data") into RDF format data (which may also be referred to as "RDF data") is that it is difficult to automatically select an appropriate vocabulary used to convert CSV data into RDF data. When input data is CSV data, a vocabulary is used to convert comma-separated character strings into the data structure "subject, predicate, object". Here, a predicate is a character string indicating a relationship between two character strings representing a subject and an object. It is preferable to select an industry-standard vocabulary and use a predicate in the vocabulary. When industry-standard vocabularies are not used for conversion into RDF data, it becomes difficult to reuse the RDF data and to achieve the object of facilitating the use of open data. Currently, 1291 vocabularies listed at http://prefix.cc/ are registered as industry-standard vocabularies. To facilitate the use of open data, it is preferable to select an appropriate vocabulary from the industry-standard vocabularies for conversion into RDF data (see, for example, Japanese Laid-Open Patent Publication No. 2007-052723, Japanese Laid-Open Patent Publication No. 2005-258659, and Japanese Laid-Open Patent Publication No. 2014-021869).

Open Refine also uses vocabularies (see, for example, Japanese Laid-Open Patent Publication No. 2007-052723). In Open Refine, candidate character strings are presented by autocompleting input initial characters based on a database (registered vocabulary) of metadata of existing subjects, predicates, and objects. For example, when "da" is input as initial characters, "da" is autocompleted and candidate character strings such as "daily" and "date" are presented.

SUMMARY

According to an aspect of this disclosure, there is provided a non-transitory computer-readable storage medium storing a program for causing a computer to execute a process. The process includes obtaining data including multiple character strings that are separated from each other, identifying a first character string and second character strings in the obtained data, extracting third character strings indicating relationships between the first character string and the second character strings from character string collections stored in a database, selecting a character string collection from the character string collections based on proportions of the extracted third character strings included in the respective character string collections, and outputting information on the selected character string collection. Each of the character string collections includes character string sets each of which includes two character strings and a third character string indicating a relationship between the two character strings.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table illustrating examples of input data formats;

FIG. 4 is a table illustrating examples of data types and data structures;

FIG. 6 is a table illustrating exemplary results of an information (vocabulary) presentation process;

FIG. 8 is a block diagram illustrating an exemplary hardware configuration of an information presentation apparatus.

DESCRIPTION OF EMBODIMENTS

When a vocabulary to be used is known, the autocomplete technology can retrieve character strings including input initial characters from the vocabulary and present the retrieved character strings to reduce the number of characters a user needs to enter. However, when a vocabulary to be used is unknown, the autocomplete technology retrieves character strings including input initial characters from all registered vocabularies and presents all the retrieved character strings. Accordingly, with the technology of Japanese Laid-Open Patent Publication No. 2007-052723, it is difficult to identify a character string indicating a relationship between two character strings representing a subject and an object identified from input data.

An aspect of this disclosure provides a storage medium (or an information presentation program), an information presentation method, and an information presentation apparatus that can assist selection of a character string indicating a relationship between two character strings.

Embodiments of the present invention are described below with reference to the accompanying drawings. In the specification and the drawings, the same reference number is assigned to components having substantially the same function, and repeated description of those components is omitted.

<Configuration of Information Presentation System>

Figure 1:
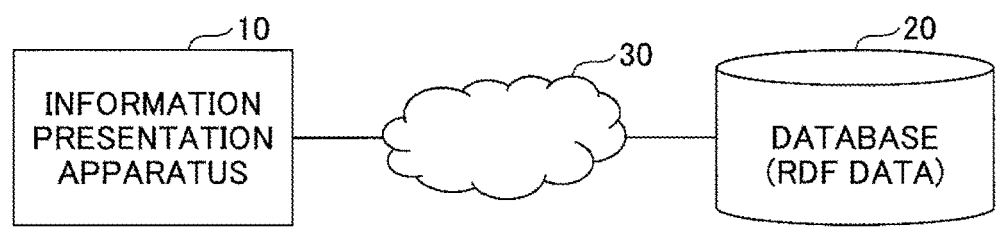
FIG. 1 is a drawing illustrating an exemplary configuration of an information presentation system.

An exemplary configuration of an information presentation system according to an embodiment is described below with reference to FIG. 1. The information presentation system of the present embodiment may include an information presentation apparatus 10 and a database 20 storing RDF data of vocabularies. The information presentation apparatus 10 and the database 20 are connected to each other via a network 30.

The information presentation apparatus 10 automatically selects an appropriate vocabulary to be used to convert input data into RDF format data (RDF data). A vocabulary is a collection (which may be referred to as a "character string collection) of multiple sets of character strings (which may be referred to as "character string sets) represented by RDF data having a data structure "subject, predicate, object". A vocabulary is used by the information presentation apparatus 10 to convert character strings in input data into a data structure "subject, predicate, object".

A predicate (V) is a character string indicating a relationship between two character strings representing a subject (S) and an object (O). As an example of a data structure "subject, predicate, object", when the subject is "Taro Honda" and the object is "Taro", "nickname" is defined as the predicate in a first vocabulary. That is, the first vocabulary contains RDF data representing "Taro Honda, nickname, Taro". In a second vocabulary, for example, "byname" is defined as the predicate. That is, the second vocabulary contains RDF data representing "Taro Honda, byname, Taro".

Thus, a predicate is a character string indicating a relationship between a subject and an object, and indicates an attribute or a property of an object. Sets of character strings are grouped into character string collections based on attributes of predicates. Examples of character string collections include a DB 21 (Foaf vocabulary), a DB 22 (Vcard vocabulary), and a DB 23 (skos vocabulary) illustrated in FIG. 2. Currently, 1291 vocabularies listed at http://prefix.cc/ are registered as industry-standard vocabularies. The 1291 vocabularies include the Vcard, Foaf, and skos vocabularies. These vocabularies are stored in a database 20. The database 20 may be stored in, for example, a server in the Cloud connected via the network 30 to the information presentation apparatus 10.

Foaf is a vocabulary indicating friendships among people. In the Foaf vocabulary, the attribute of a predicate is a friendship between a person indicated by a subject (S) and a person indicated by an object (O). The Foaf vocabulary is a collection of multiple sets of character strings indicating "subject, predicate, object" where the predicate indicates a friendship between persons indicated by the subject and the object. Examples of character strings used as predicates include "friend", "family", "colleague", "spouse", and "child".

Vcard is a vocabulary indicating business cards. In the Vcard vocabulary, the attribute of a predicate is a relationship between a person indicated by a subject (S) and a name indicated by an object (O). Examples of character strings used as predicates include "full name", "family name", "first name", "nickname", and "byname".

Also, skos is a vocabulary defining organization structures. In the skos vocabulary, the attribute of a predicate is an organizational relationship between a person indicated by a subject (S) and a name indicated by an object (O).

Industry-standard vocabularies are not limited to the above described vocabularies, and can be defined based on RDF format data available at Web sites (1) and (2) below.

(1) "Resource Description Framework (RDF) Model and Syntax Specification", Ora Lassila, Ralph R. Swick, [online], Internet <URL:http://www.w3.org/TR/1999/REC-rdf-syntax-19990222/>

(2) "RDF Vocabulary Description Language 1.0: RDF Schema", Dan Brickley, R. V. Guha, [online], Internet <URL:http://www.w3.org/TR/rdf-schema/>

To convert input data with a format other than the RDF format into RDF format data, it is preferable to use a vocabulary selected from 1291 vocabularies defined at http://prefix.cc/. However, it is difficult to manually examine all the definitions of the 1291 vocabularies and find a vocabulary including predicates suitable to convert character strings in input data into RDF format data. Also, it is not possible to determine which vocabulary is used at a high frequency by examining the definitions of the vocabularies.

Further, one vocabulary may not necessarily include all predicates indicating relationships of objects included in input data. That is, a predicate indicating a relationship of an object in input data and a predicate indicating a relationship of another object in the input data may be included in different vocabularies. Even in such a case, it is preferable to select the minimum number of vocabularies including predicates indicating relationships of all objects in input data. However, it is also difficult to find an appropriate combination of vocabularies by manually examining the definitions of the 1291 vocabularies.

The information presentation apparatus 10 of the present embodiment can automatically present one or more vocabularies suitable to convert input data such as CSV data into RDF data, and thereby support selection of a character string used as a predicate indicating a relationship between two character strings representing a subject and an object.

<Functional Configuration>

Figure 2:
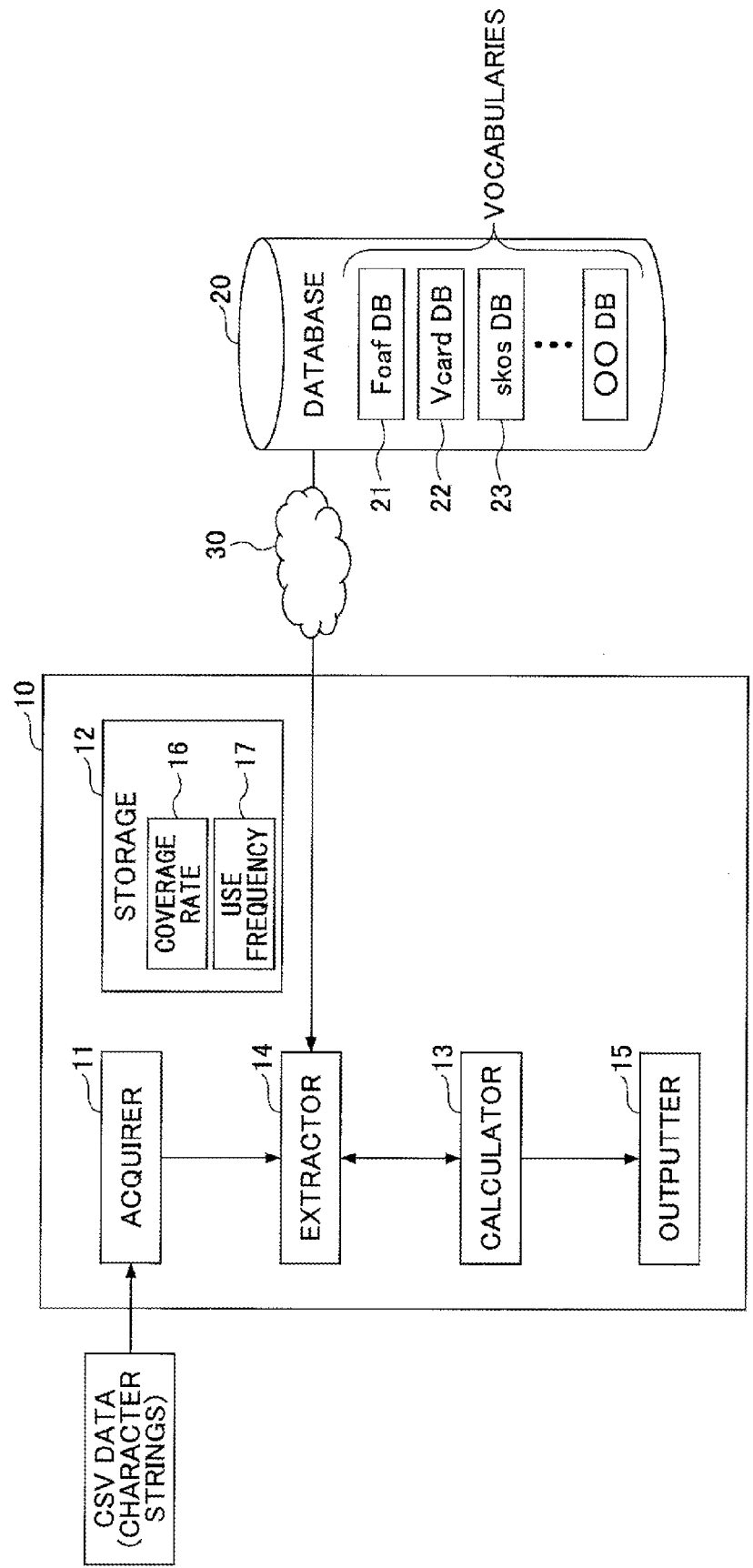
FIG. 2 is a drawing illustrating an exemplary functional configuration of an information presentation apparatus.

Next, an exemplary functional configuration of the information presentation apparatus 10 of the present embodiment is described with reference to FIG. 2. The information presentation apparatus 10 may include an acquirer 11, a storage 12, a calculator 13, an extractor 14, and an outputter 15.

The acquirer 11 obtains data including multiple separated character strings. In the present embodiment, it is assumed that the acquirer 11 obtains a CSV file containing CSV data. As illustrated in FIG. 3, CSV data includes comma-separated character strings. In the example of FIG. 3, CSV data includes character strings "A", "B", "C" . . . separated by commas.

In the present embodiment, CSV data is used as an example of input data. However, input data is not limited to CSV data. Other examples of input data include tab-separated value (TSV) data and space-separated value (SSV) data. In the example of FIG. 3, TSV data includes character strings "A", "B", "C" separated by tabs. In the example of FIG. 3, SSV data includes character strings "A", "B", "C" . . . separated by spaces.

The extractor 14 identifies a specific character string in the CSV data as a subject, identifies multiple character strings in the CSV data including or excluding the subject as objects, and extracts character strings indicating relationships between the subject and the objects from vocabularies in the database 20.

The extractor 14 identifies one of the character strings in the CSV data in the CSV file as the specific character string. In the present embodiment, the extractor 14 identifies a character string in the first field of the CSV data as the subject.

The specific character string may also be used as identification information ID of the input CSV data. In the example of FIG. 4, a character string "Taro Honda" in the first field of the CSV data is used as identification information ID of the CSV data. The identification information ID may include a uniform resource locator (URL). For example, it is possible to easily obtain CSV data by accessing a site storing the CSV data with a Web browser using a URL to which the character string "Taro Honda" in the first field of the CSV data of FIG. 4 is added.

Also, the extractor 14 may be configured to select, from the database 20, one or more vocabularies including a specific character string having the same attribute as a class obtained by the acquirer 11, and extract predicates from the selected vocabularies without searching unselected vocabularies.

Although a character string in the first field of CSV data is identified as the specific character string in the present embodiment, a character string in the second or subsequent field of CSV data may be identified as the specific character string.

For example, when "person" is specified as a class, the extractor 14 may be configured to search only vocabularies in a "person" category and to not search vocabularies in other categories (e.g., dog and cat categories). This configuration makes it possible to reduce the time necessary to search vocabularies.

For example, when CSV data includes seven character strings "Taro Honda, Honda, Taro, Osaka-fu, 1986-07-13, http://server/TaroHonda.jpg, male" as illustrated in FIG. 4, according to the present embodiment, "Taro Honda" is identified as a subject and is used as identification information ID1 of the CSV data. Also, as described above, the identification information ID1 may be represented by a combination of "Taro Honda" and a URL indicating a site storing the CSV data.

Objects are comma-separated character strings in CSV data. In the case of the CSV data of FIG. 4, each of the seven character strings "Taro Honda", "Honda", "Taro", "Osaka-fu", "1986-07-13", "http://server/TaroHonda.jpg", and "male" becomes an object. Alternatively, character strings in the second and subsequent fields may be used as objects. In this case, each of six character strings "Honda", "Taro", "Osaka-fu", "1986-07-13", "http://server/TaroHonda.jpg", and "male" becomes an object.

The extractor 14 extracts predicates indicating relationships between the subject "Taro Honda" and the respective seven objects "Taro Honda", "Honda", "Taro", "Osaka-fu", "1986-07-13", "http://server/TaroHonda.jpg", and "male" from vocabularies in the database 20.

The calculator 13 calculates a coverage rate 16 and a use frequency 17. The coverage rate 16 indicates a proportion of the extracted predicates included in each vocabulary in the database 20. For example, the coverage rate 16 indicates how many predicates used for RDF data of FIG. 4 are included in each vocabulary in the database 20. When, for example, the Foaf vocabulary includes six predicates out of seven predicates corresponding to the seven objects in FIG. 4, the coverage rate 16 of the Foaf vocabulary becomes 6/7.

The use frequency 17 indicates the number of instances of the extracted predicates in each vocabulary or a combination of vocabularies in the database 20. In other words, the use frequency 17 indicates the number of times the extracted predicates appear in each vocabulary or a combination of vocabularies in the database 20. For example, when extracting predicates indicating a relationship between a subject "Taro Honda" in the first field of RDF data of FIG. 4 and an object "Taro Honda", the extractor 14 searches vocabularies with a class "person" in the database 20. Here, it is assumed that the search result indicates that the subject "Taro Honda" and the object "Taro Honda" are used 100 times together with a predicate "full name" and are used 50 times together with a predicate "name". In this case, the calculator 13 obtains "150" as a total number of instances of extracted predicates (in this example, "full name" and "name") included in the searched vocabularies, and sets the use frequency 17 at "150". The storage 12 stores the coverage rates 16 and the use frequency (or use frequencies) 17 calculated by the calculator 13.

Based on the coverage rates 16, the extractor 14 selects one or more suitable vocabularies from the vocabularies in the database 20. The extractor 14 preferably selects one of the vocabularies in the database 20 that has the highest coverage rate 16.

When not all predicates are included in a single vocabulary, the extractor 14 may also select another vocabulary including predicates not included in the vocabulary. For example, when a predicate "gender" is not included in the Foaf vocabulary whose coverage rate 16 is 6/7, the extractor 14 may also select another vocabulary (e.g., the Vcard vocabulary) where the predicate "gender" is most often used. In this case, the extractor 14 selects a combination of the Foaf and Vcard vocabularies.

The extractor 14 may also be configured to select a vocabulary from the vocabularies in the database 20 based on the use frequencies 17. For example, the extractor 14 may be configured to select one of the vocabularies in the database 20 that has the highest use frequency 17. Thus, the extractor 14 can select one or more suitable vocabularies based on at least one of the coverage rates 16 and the use frequencies 17. Also, the extractor 14 may be configured to select one or more suitable vocabularies prioritizing the coverage rates 16 over the use frequencies 17.

The outputter 15 outputs information on a selected vocabulary (or vocabularies). For example, the outputter 15 may display information on a selected vocabulary on a display or print the information on a recording medium. The outputter 15 may also report suitable predicates in addition to the information on a selected vocabulary. For example, the outputter 15 may display or report that a predicate "full name" is preferably selected from the Foaf vocabulary and a predicate "gender" is preferably selected from the Vcard vocabulary. Also, the outputter 15 may select most suitable predicates from the selected vocabulary, automatically attach the selected predicates to the subject and the objects, and thereby automatically generate RDF data. For example, the outputter 15 may select predicates indicating the relationships between the subject and the objects in the RDF data of FIG. 4 from the selected vocabulary, and automatically attach the selected predicates to the RDF data.

As described above, the information presentation apparatus 10 of the present embodiment can automatically select one or more vocabularies suitable to generate RDF data based on input data, from 1291 standard vocabularies used for existing LOD.

A database "a" and a database "b" generated using the same standard vocabulary can be easily reused to generate a new database "c" even when they are generated by different parties. Also, the information presentation apparatus 10 may be configured to generate a new database "c" from the database "a" and the database "b".

For example, assuming that Mr. A has created a database "s" of soccer players and Mr. B has created a database "t" of baseball players by extracting predicates from different vocabularies, it may be difficult to generate a new database "u" of volleyball players using the database "s" and the database "t". That is, because the predicates used in the databases "s" and "t" have been extracted from different vocabularies, the predicates used in the database "s" and the predicates used in the database "t" are inconsistent with each other, and this inconsistency makes it difficult for a computer to reuse the databases "s" and "t".

Thus, it is preferable to create a new database by using a vocabulary used for many existing databases so that the new database can be reused.

The information presentation apparatus 10 of the present embodiment selects one or more suitable vocabularies based on the coverage rates 16 and the use frequencies 17 of character strings in input CSV data. Then, predicates used in the selected vocabularies are used as predicates in RDF data generated by converting the CSV data. By generating RDF data using existing LOD data (i.e., a suitable vocabulary) with a data structure "subject, predicate, object", the generated RDF data becomes highly reusable LOD. Also, compared with a case where a suitable vocabulary is manually searched for, the information presentation apparatus 10 makes it possible to find a suitable vocabulary more speedily. Further, the information presentation apparatus 10 can limit the range of search by selecting vocabularies belonging to the obtained class from the database 20. This configuration makes it possible to reduce the time necessary to select vocabularies to be used.

<Information Presentation Process>

Figure 5:
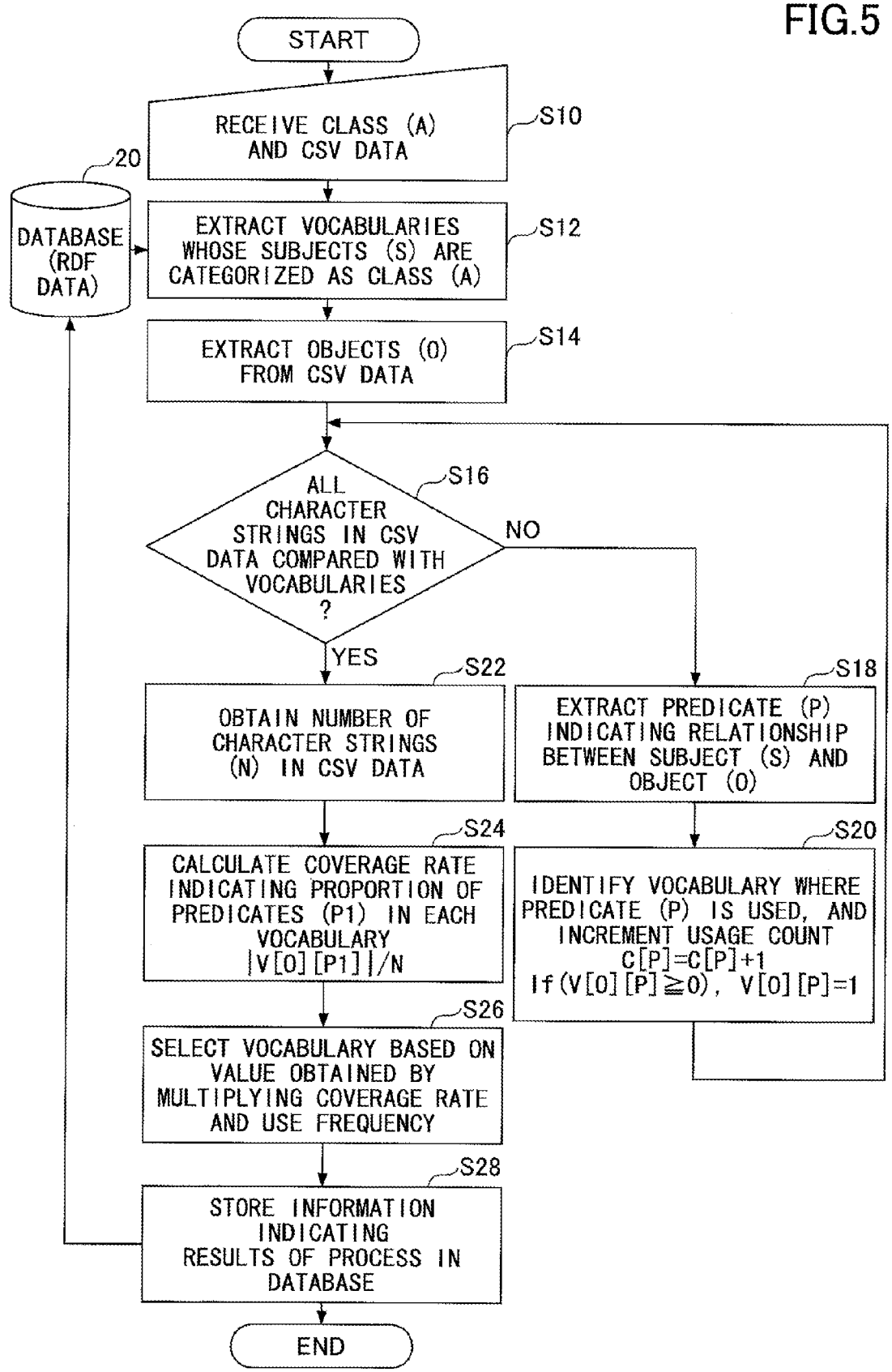
FIG. 5 is a flowchart illustrating an exemplary information (vocabulary) presentation process.

Next, an exemplary information (vocabulary) presentation process of the present embodiment is described with reference to FIG. 5. When the process of FIG. 5 is started, the acquirer 11 receives a class (A) and CSV data, and obtains first data from the CSV data (step S10).

Figure 7:
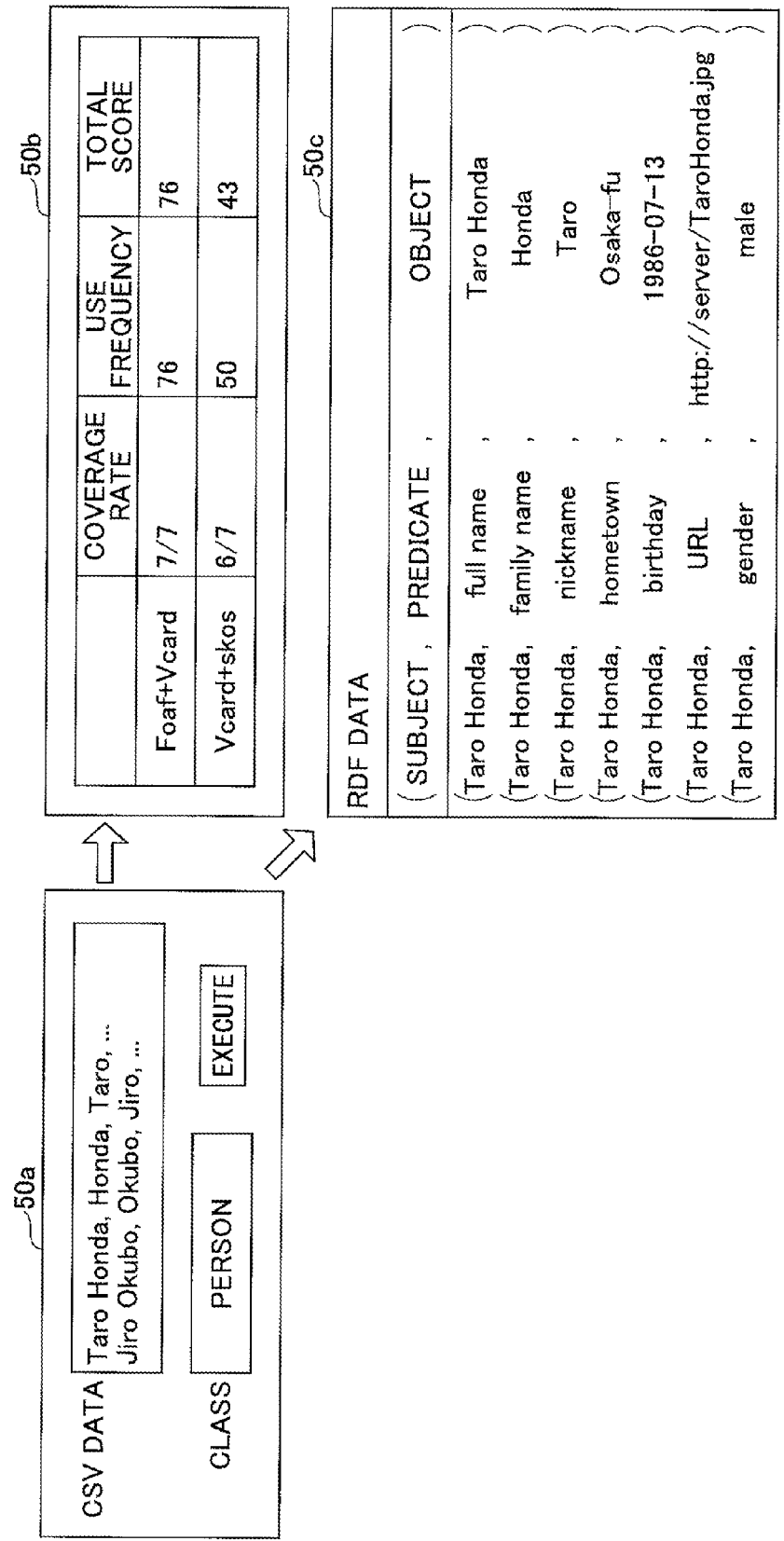
FIG. 7 is a drawing illustrating exemplary screens displaying results of an information (vocabulary) presentation process.

In this exemplary process, it is assumed that the acquirer 11 obtains the first data of the CSV data that includes character strings "Taro Honda, Honda, Taro, Osaka-fu, 1986-07-13, http://server/TaroHonda.jpg, male" illustrated on the left side of FIG. 7. Also in this exemplary process, it is assumed that the acquirer 11 obtains second data of the CSV data that includes character strings "Jiro Okubo, Okubo, Jiro, Fukuoka prefecture, 1982-06-09, male". The first field of the CSV data represents a class (A). In this example, based on the character strings "Taro Honda" and "Jiro Okubo" in the first field, "person" is determined as the class (A).

Next, the extractor 14 extracts (or selects) vocabularies whose subjects are categorized as the class "person" from the existing database 20 (step S12).

Next, the extractor 14 extracts (or identifies) objects (O) from the CSV data (step S14). In the present embodiment, the extractor 14 extracts character strings including a character string in the first field from the CSV data as objects (O). In the example of FIG. 4, to generate RDF data, all of seven character strings in the first data of the CSV data are extracted as objects (O). That is, seven character strings "Taro Honda", "Honda", "Taro", "Osaka-fu", "1986-07-13", "http://server/TaroHonda.jpg", and "male" are extracted from the first data "Taro Honda, Honda, Taro, Osaka-fu, 1986-07-13, http://server/TaroHonda.jpg, male" of the CSV data. Also, the extractor 14 may be configured to extract character strings in the second and subsequent fields as objects (O).

Next, the extractor 14 determines whether all character strings in the CSV data have been compared with the vocabularies (step S16). The extractor 14 repeats steps S18 and S20 until all character strings in the CSV data are compared with the vocabularies.

At step S18, from the vocabularies extracted at step S12, the extractor 14 extracts a predicate (P) indicating a relationship between an object (O) and a subject (S) used in the vocabularies for each of the objects (O) extracted at step S14. Each vocabulary includes multiple sets of character strings "subject, predicate, object". For each object (O) extracted at step S14, the extractor 14 searches each vocabulary to find a predicate (P) used for the object (O) in the vocabulary and extracts the found predicate (P).

Next, at step S20, the calculator 13 identifies the vocabulary where the predicate (P) is used, and increments a usage count (C[P]=C[P]+1) indicating the number of times the predicate (P) is used in the vocabulary. For example, when "full name" is used as a predicate P1 for an object in a vocabulary and "name" is used as a predicate P1 for an object in another vocabulary, the calculator 13 increments the usage count C[P] for each of "full name" and "name".

A predicate in each set of character strings "subject, predicate, object" is expressed in such a manner that a vocabulary including the predicate can be identified (e.g., "Foaf: full name", "Vcard: name"). This notation is defined in a standardization document "Tim Bray, et al., Namespaces in XML, 2009, W3C Recommendation <http://www.w3.org/TR/REC-xml-names>". Based on this notation, the calculator 13 can identify vocabularies where predicates (P) are used, and can increment usage counts of the predicates (P) "full name" and "name" for the respective vocabularies.

Also, when a predicate (P) corresponding to an object (O) is used in a vocabulary, the calculator 13 turns on a flag indicating that the predicate (P) is used in the vocabulary (If(V[O][P]≥0), V[O][P]=1) to indicate that the predicate (P) is covered by the vocabulary. For example, when there are seven objects (O), the calculator 13 turns on flags for respective vocabularies where predicates (P) corresponding to the seven objects (O) are used.

When the extractor 14 determines at step S16 that all character strings in the CSV data have been compared with the vocabularies, the calculator 13 obtains the number of character strings (N) in the CSV data (step S22). In the example of FIG. 4, the number of character strings (N) in the CSV data is 7.

Next, the calculator 13 calculates the coverage rate 16 indicating a proportion of the number of predicates (P1) found in each vocabulary to the number of objects (O) (step S24). More specifically, the calculator 13 calculates the coverage rate 16 based on the number of character strings (N) in the CSV data and the absolute value of the number of turned-on flags indicating predicates (P) covered by each vocabulary (|V[O][P1]|/N). In other words, the calculator 13 calculates the coverage rate 16 indicating a proportion of predicates (P1) covered by each vocabulary to predicates (V) corresponding to seven objects (O). The calculator 13 calculates the coverage rate 16 for each of vocabularies that cover all objects (O).

The calculator 13 calculates the use frequency 17 based on the usage count (C[P]) of a predicate (P) corresponding to each object (O). For example, when "full name" is used 100 times in the Foaf vocabulary as a predicate (P) for the object (O) "Taro Honda", C[P(full name)] becomes 100. Also, when "name" is used 50 times in the Vcard vocabulary, C[P(name)] becomes 50. In this case, the use frequency 17 of predicates (P) "full name" and "name" for "Taro Honda" becomes 150.

Next, the extractor 14 selects the most suitable vocabulary based on the coverage rates 16 and the use frequencies 17 calculated for the respective vocabularies. When predicates for all objects are not covered by one vocabulary, the extractor 14 selects another vocabulary having the second highest coverage rate 16 for the predicates not covered. Until predicates for all objects are covered, the extractor 14 repeats a process of searching another vocabulary for objects whose predicates are not covered and extracting predicates used in the vocabulary.

When predicates for all objects are covered or all vocabularies have been searched, the extractor 14 ends step S26. When the CSV data includes multiple records (or rows), steps S14 through S26 are repeated for each row. As a result, one or more vocabularies with high coverage rates 16 and high use frequencies 17 are selected for each record in the CSV data. From combinations of vocabularies selected for respective records, the outputter 15 selects a vocabulary or a combination of vocabularies suitable for converting the CSV data into RDF data based on a value obtained by multiplying the coverage rate 16 and the use frequency (i.e., selects a vocabulary or a combination of vocabularies with the highest value), and presents information indicating the selected vocabulary or combination of vocabularies. The storage 12 stores information indicating the results of the above process in the database 20 so that the information can be used when the process is executed next time (step S28), and ends the process.

FIG. 6 illustrates an example of results of the above process. In the example of FIG. 6, for the Foaf vocabulary with a class "person", the coverage rate 16 is "6/7" and the use frequency 17 is "123". Also in FIG. 6, for the Vcard vocabulary with a class "person", the coverage rate 16 is "5/7" and the use frequency 17 is "256". Further in FIG. 6, for a combination of the skos and Vcard vocabularies with a class "person", the coverage rate 16 is "6/7" and the use frequency 17 is "50".

In this case, because the coverage rate 16 of the Foaf vocabulary is 6/7, the extractor 14 selects another vocabulary including a remaining predicate not covered by the Foaf vocabulary. Assuming that the Vcard vocabulary includes the remaining predicate, the coverage rate 16 of the combination of the Foaf and Vcard vocabularies becomes 7/7, which indicates that predicates for all objects can be extracted from the Foaf and Vcard vocabularies. When the Foaf and Vcard vocabularies are combined to achieve the coverage rate 16 of 7/7, the use frequency 17 becomes "76" (which may be obtained, for example, by "use frequency of Foaf+use frequency of Vcard−duplicate use frequency"). Therefore, the calculator 13 obtains a total score of "76" for the combination of Foaf and Vcard vocabularies by multiplying the coverage rate "7/7" and the use frequency "76".

Also, because the coverage rate 16 of the Vcard vocabulary is "5/7", the extractor 14 selects another vocabulary including a remaining predicate (one of remaining predicates) not covered by the Vcard vocabulary. Assuming that the skos vocabulary includes the remaining predicate, the coverage rate 16 of the combination of the Vcard and skos vocabularies becomes 6/7, which indicates that predicates for six objects out of seven objects can be extracted from the Vcard and skos vocabularies. When the Vcard and skos vocabularies are combined to achieve the coverage rate 16 of 6/7, the use frequency 17 becomes "50" (which may be obtained, for example, by "use frequency of Vcard+use frequency of skos−duplicate use frequency"). Therefore, the calculator 13 obtains a total score of "43" for the combination of Vcard and skos vocabularies by multiplying the coverage rate "6/7" and the use frequency "50".

The outputter 15 presents vocabularies to be used. FIG. 7 illustrates exemplary screens output by the information presentation apparatus 10. When a user enters CSV data and a class in the corresponding fields displayed on a screen 50*a* of the information presentation apparatus 10 and presses an Execute button, the information presentation apparatus 10 executes the information presentation process of FIG. 5.

The outputter 15 displays results of the information presentation process on a screen 50*b* of FIG. 7. The screen 50*b* displays (combinations of) recommended vocabularies in descending order of total scores. As illustrated in FIG. 7, the outputter 15 may display a coverage rate, a use frequency, and a total score for each combination of vocabularies. However, the screen 50*b* is just an example, and the outputter 15 may be configured to present a combination of vocabularies with the highest total score.

Also, as illustrated by a screen 50*c*, the outputter 15 may be configured to display predicates used when a combination of vocabularies (in this example, Foaf+Vcard) with the highest total score is selected, in association with the corresponding subject and objects. In this case, it is preferable to also provide information indicating which predicate is used in which vocabulary. For example, a predicate "gender" extracted from the Vcard vocabulary may be displayed as "Vcard: gender" and other predicates extracted from the Foaf vocabulary may be displayed as "Foaf: full name" . . . "Foaf: URL".

Also, the outputter 15 may be configured to display predicates used when a combination of vocabularies with the second highest total score is selected, in association with the corresponding subject and objects. Further, the information presentation apparatus 10 may be configured to automatically generate RDF data corresponding to input CSV data.

As described above, the information presentation apparatus 10 of the present embodiment selects one or more suitable vocabularies based on the coverage rates 16 and the use frequencies 17 of character strings in input CSV data. Then, predicates used in the selected vocabularies are used as predicates in RDF data generated by converting the CSV data. This configuration makes it possible to generate RDF data as highly-reusable LOD.

Also, the information presentation apparatus 10 can limit the range of search by selecting vocabularies from the database 20 based on a class assigned to subjects in RDF data. This configuration makes it possible to reduce the time necessary to select vocabularies to be used.

In the present embodiment, a predicate is extracted from a vocabulary only when a character string (object) in input data perfectly matches an object used in the vocabulary. However, a predicate may be extracted from a vocabulary not only when an object in input data perfectly matches an object in the vocabulary but also when an object in the input data partially matches an object used in the vocabulary. For example, when an object "Osaka" partially matches an object "Osaka-fu", a corresponding predicate may be extracted.

<Hardware Configuration>

Next, an exemplary hardware configuration of the information presentation apparatus 10 of the present embodiment is described with reference to FIG. 8. The information presentation apparatus 10 may include an input device 101, a display device 102, an external I/F 103, a random access memory (RAM) 104, a read-only memory (ROM) 105, a central processing unit (CPU) 106, a communication I/F 107, and a hard disk drive (HDD) 108 that are connected to each other via a bus B.

The input device 101 may include a keyboard and a mouse, and is used to input instructions (or operation signals) into the information presentation apparatus 10. The display device 102 includes a display, and displays, for example, suitable vocabularies and automatically generated RDF data.

The communication I/F 107 is an interface for connecting the information presentation apparatus 10 to a network. The information presentation apparatus 10 can access the database 20 via the communication I/F 107 to search vocabularies stored in the database 20.

The HDD 108 is a non-volatile storage device for storing various programs and data. The programs and data stored in the HDD 108 include basic software for controlling the entire information presentation apparatus 10 and application software. For example, the HDD 108 stores various types of database information and programs.

The external I/F 103 is an interface between the information presentation apparatus 10 and an external device such as a storage medium 103a. The information presentation apparatus 10 can read and write data from and to the storage medium 103a via the external I/F 103. The storage medium 103a may be implemented by, for example, a compact disk (CD), a digital versatile disk (DVD), a secure digital (SD) memory card, or a universal serial bus (USB) memory.

The ROM 105 is a non-volatile semiconductor memory (storage device) that can retain data even when power is turned off. The ROM 105 stores, for example, programs and data such as network settings. The RAM 104 is a volatile semiconductor memory (storage device) for temporarily storing programs and data. The CPU 106 is a processor that loads programs and data from storage devices (e.g., the HDD 108 and the ROM 105) into the RAM 104, and executes the loaded programs to control the entire information presentation apparatus 10 and to implement various functions of the information presentation apparatus 10.

With the above hardware configuration, the information presentation apparatus 10 of the present embodiment can execute the information (vocabulary) presentation process as described above. For example, the CPU 106 executes the information (vocabulary) presentation process using the programs and data stored in the ROM 105 and the HDD 108. Thus, with the above hardware configuration, the information presentation apparatus 10 of the present embodiment can present information on vocabularies to be used to convert input data into RDF data, and display the RDF data generated by automatically converting the input data.

An information presentation program, a storage medium storing the information presentation program, an information presentation method, and an information presentation apparatus according to embodiments are described above. However, the present invention is not limited to the specifically disclosed embodiments, and variations and modifications may be made without departing from the scope of the present invention. Also, the embodiments may be combined unless they conflict with each other. Further, functions of the information presentation apparatus 10 may be implemented by hardware, software, or a combination of hardware and software.

The configuration of the information presentation system of the above embodiment is just an example, and is not intended to limit the scope of the present invention. Various system configurations may be used depending on applications and purposes.

More specifically, the present invention is not limited to the configuration of the information presentation system of the above embodiment where the information presentation apparatus 10 is connected via the network 30 to the database 20. For example, the information presentation system may include two or more information presentation apparatuses 10. When the information presentation system includes multiple information presentation apparatuses 10, the information (vocabulary) presentation process can be executed by multiple information presentation apparatuses 10 according to a distributed processing technique. Also, one of the multiple information processing apparatuses 10 may be selected to execute the information presentation process depending on an application or a purpose.

The information presentation apparatus 10 may be implemented by any type of electronic apparatus having a communication function. For example, the information presentation apparatus 10 may be implemented by a server or a personal computer.

An aspect of this disclosure provides a storage medium (or an information presentation program), an information presentation method, and an information presentation apparatus that can assist selection of a character string indicating a relationship between two character strings.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program that causes a computer to execute a process, the process comprising:

obtaining data including multiple character strings that are separated from each other;

identifying a first character string and second character strings in the obtained data;

extracting third character strings indicating relationships between the first character string and the second character strings in the obtained data from character string collections stored in a database, each of the character string collections including character string sets each of which includes two character strings and a third character string indicating a relationship between the two character strings;

automatically selecting a character string collection from the character string collections based on coverage rates of the respective character string collections, each of the coverage rates indicating a ratio of a number of the third character strings extracted from a corresponding one of the character string collections to a number of the second character strings in the obtained data; and automatically converting the obtained data into a predetermined format by automatically attaching, to the first character string and the second character strings in the obtained data, the third character strings used in the selected character string collection and indicating the relationships between the first character string and the second character strings in the obtained data.

2. The storage medium as claimed in claim 1, wherein in the selecting, the character string collection is selected from the character string collections based also on a number of times the extracted third character strings appear in each of the character string collections.

3. The storage medium as claimed in claim 1, wherein when one or more of the extracted third character strings are not included in the selected character string collection, the selecting further includes selecting another character string collection from the character string collections based on a number of times the one or more of the extracted third character strings appear in each of the character string collections.

4. The storage medium as claimed in claim 1, the process further comprising:
obtaining a type of the obtained data,
wherein in the extracting, the third character strings are extracted from one or more of the character string collections that belong to the obtained type.

5. A method executed by a computer, the method comprising:
obtaining data including multiple character strings that are separated from each other;
identifying a first character string and second character strings in the obtained data;
extracting third character strings indicating relationships between the first character string and the second character strings in the obtained data from character string collections stored in a database, each of the character string collections including character string sets each of which includes two character strings and a third character string indicating a relationship between the two character strings;
automatically selecting a character string collection from the character string collections based on coverage rates of the respective character string collections, each of the coverage rates indicating a ratio of a number of the third character strings extracted from a corresponding one of the character string collections to a number of the second character strings in the obtained data; and
automatically converting the obtained data into a predetermined format by automatically attaching, to the first character string and the second character strings in the obtained data, the third character strings used in the selected character string collection and indicating the relationships between the first character string and the second character strings in the obtained data.

6. The method as claimed in claim 5, wherein in the selecting, the character string collection is selected from the character string collections based also on a number of times the extracted third character strings appear in each of the character string collections.

7. The method as claimed in claim 5, wherein when one or more of the extracted third character strings are not included in the selected character string collection, the selecting further includes selecting another character string collection from the character string collections based on a number of times the one or more of the extracted third character strings appear in each of the character string collections.

8. The method as claimed in claim 5, further comprising:
obtaining a type of the obtained data,
wherein in the extracting, the third character strings are extracted from one or more of the character string collections that belong to the obtained type.

9. An information presentation apparatus, comprising:
a memory storing an instruction; and
a processor coupled to the memory that executes the instruction causing the processor to perform a process, the process including
obtaining data including multiple character strings that are separated from each other,
identifying a first character string and second character strings in the obtained data,
extracting third character strings indicating relationships between the first character string and the second character strings in the obtained data from character string collections stored in a database, each of the character string collections including character string sets each of which includes two character strings and a third character string indicating a relationship between the two character strings,
automatically selecting a character string collection from the character string collections based on coverage rates of the respective character string collections, each of the coverage rates indicating a ratio of a number of the third character strings extracted from a corresponding one of the character string collections to a number of the second character strings in the obtained data, and
automatically converting the obtained data into a predetermined format by automatically attaching, to the first character string and the second character strings in the obtained data, the third character strings used in the selected character string collection and indicating the relationships between the first character string and the second character strings in the obtained data.

10. The information presentation apparatus as claimed in claim 9, wherein in the selecting, the character string collection is selected from the character string collections based also on a number of times the extracted third character strings appear in each of the character string collections.

11. The information presentation apparatus as claimed in claim 9, wherein when one or more of the extracted third character strings are not included in the selected character string collection, the selecting further includes selecting another character string collection from the character string collections based on a number of times the one or more of the extracted third character strings appear in each of the character string collections.

12. The information presentation apparatus as claimed in claim 9, wherein
the process further includes obtaining a type of the obtained data; and
in the extracting, the third character strings are extracted from one or more of the character string collections that belong to the obtained type.

* * * * *